3,280,160
SILOXANE-OXYALKYLENE BLOCK COPOLYMERS
Donald L. Bailey, St. Mary's, W. Va., assignor to Union Carbide Corporation, a corporation of New York
No Drawing. Filed Mar. 30, 1965, Ser. No. 444,059
9 Claims. (Cl. 260—448.2)

This application is a continuation-in-part of application Serial No. 165,243, filed January 9, 1962 which in turn is a continuation-in-part of applications Serial No. 823,-283, now U.S. Patent No. 3,218,344, Serial No. 823,290 and Serial No. 823,300, now abandoned, all of said applications filed June 29, 1959.

The copolymers of this invention are of the class that are known as "block" copolymers. Block copolymers are composed of at least two sections or blocks, at least one section or block composed of one type of recurring units or groups (e.g., siloxane units as in the copolymers of this invention) and at least one other section or block composed of a different type of recurring units or groups (e.g., oxyalkylene groups as in the copolymers of this invention). The copolymers of this invention contain one or more siloxane blocks and one or more oxyalkylene blocks.

The siloxane blocks in the copolymers of this invention contain at least one siloxane unit represented by the formula (1) 

and at least one siloxane unit represented by the formula (2) 

In the above Formulas 1 and 2 R is a monovalent hydrocarbon group or a divalent hydrocarbon group, $b$ has a value from 1 to 3, $e$ has a value from 0 to 2, $f$ has a value from 1 to 2, and the sum of $e+f$ has a value from 1 to 3. Preferably, R contains from one to about twelve carbon atoms. The groups represented by R can be the same or different in any given siloxane unit or throughout the siloxane block, and the values of $b$, $e$, and $f$, in the various siloxane units in each siloxane block can be the same or different. The divalent hydrocarbon groups represented by R link the siloxane block to the oxyalkylene block. Each siloxane block contains at least one group represented by the Formula 1 or 2 wherein at least one group represented by R is a divalent hydrocarbon group. The siloxane block has a ratio of hydrocarbon groups to silicon atoms from 1:1 to 2.5:1. The siloxane block (and, in turn, the copolymer) has a ratio of silicon-bonded hydrogen atoms (SiH) to silicon atoms (Si) of at least 1 to 14 (preferably from 1 to 14 to 1 to 5 inclusive).

Illustrative of the monovalent hydrocarbon groups that are represented by R in Formulas 1 and 2 are the alkenyl groups (for example, the vinyl group and the allyl groups); the cycloalkenyl groups (for example, the cyclohexenyl group); the alkyl groups (for example, the methyl, ethyl, isopropyl, octyl, and dodecyl groups); the aryl groups (for example, the phenyl and naphthyl groups); the aralkyl groups (for example, the benzyl and the phenylethyl groups); the alkaryl groups such as the styryl, tolyl and n-hexylphenyl groups, and the cycloalkyl groups (for example, the cyclohexyl group).

Illustrative of the divalent hydrocarbon groups represented by R in Formulas 1 and 2 are the alkylene groups (such as the methylene, ethylene, propylene, butylene, 2,2-dimethyl-1,3-propylene and decylene groups), the arylene groups (such as the phenylene and p,p'-diphenylene groups), and the alkarylene groups (such as the phenylethylene group). Preferably, the divalent hydrocarbon group is an alkylene group containing from two to four carbon atoms. Siloxane groups containing divalent hydrocarbon groups as substituents are illustrated by groups having the formulas:

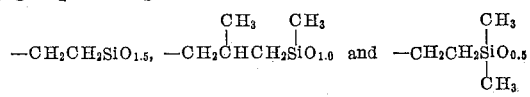

The divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane units that are represented by Formulas 1 and 2 wherein either the same hydrocarbon groups are attached to a silicon atom (e.g., the dimethylsiloxy, diphenylsiloxy and diethylhydrogensiloxy groups) or different hydrocarbon groups are attached to a silicon atom (e.g., the methylphenylsiloxy, phenylmethylhydrogensiloxy and ethylvinylsiloxy groups).

The siloxane block in the copolymers of this invention can contain one or more types of siloxane groups that are represented by Formulas 1 and 2 provided that at least one group has at least one divalent hydrocarbon substituent.

The siloxane block contained in the copolymers useful in this invention can contain trifunctional siloxane units (e.g., $HSiO_{1.5}$ or $CH_3SiO_{1.5}$ units), difunctional siloxane units (e.g., $CH_3(H)SiO$— or $(CH_3)_2SiO$— units), monofunctional siloxane units (e.g., $(CH_3)_2(H)SiO_{0.5}$ or $(CH_3)_3SiO_{0.5}$ units) or combinations of these types of siloxane units having the same or different substituents. Due to the varying functionality of the siloxane units, the siloxane block can be predominately linear or cyclic or crosslinked or it can have combinations of these structures.

The siloxane block or blocks contained in the copolymers of this invention can contain organic end-blocking or chain terminating organic groups, in addition to the monofunctional siloxane chain terminating groups encompassed by Formulas 1 and 2. By way of illustration, the siloxane block can contain such organic end-blocking groups as the hydroxyl group, the aryloxy groups (such as the phenoxy groups), the alkoxy groups (such as the methoxy, ethoxy, propoxy and butoxy groups), the acyloxy groups (such as the acetoxy group), and the like.

The siloxane blocks in the copolymers of this invention each contain at least one siloxane unit represented by Formula 1 and at least one siloxane unit represented by Formula 2. Preferably, the siloxane blocks each contain a total of from five to twenty siloxane groups that are represented by Formulas 1 and 2. That part of the average molecular weight of the copolymer that is attributable to the siloxane blocks can be as high as 50,000 or greater but preferably it is from 220 to 20,000.

The oxyalkylene blocks in the copolymers of this invention each contain at least one (preferably at least four) oxyalkylene groups that are represented by the formula:

(3) 

wherein R' is an alkylene group. Preferably, the alkylene group represented by R' in Formula 3 contains from two to about ten carbon atoms, and most preferably from two to three carbon atoms. Illustrative of the oxyalkylene groups that are represented by Formula 3 are the oxyethylene, oxy-1,2-propylene, oxy-1,3-propylene, oxy-2,2-dimethyl-1,3-propylene, oxy-1,10-decylene groups, and the like.

The oxyalkylene blocks in the copolymers of this invention can contain one or more of the various types of oxyalkylene groups represented by Formula 3. By way of illustration, the oxyalkylene blocks can contain only oxyethylene groups or only oxypropylene groups or both oxyethylene and oxypropylene groups, or other combinations of the various types of oxyalkylene groups represented by Formula 3.

The oxyalkylene blocks in the copolymers of this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also, a single group can serve as an end-blocking group for more than one oxyalkylene block. For example, the glyceroxy group,

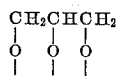

can serve as an end-blocking group for three oxyalkylene chains.

The oxyalkylene blocks in the copolymers of this invention each contain at least one (preferably at least four) oxyalkylene groups that are represented by Formula 3. Most preferably, each block contains from four to thirty of such groups. Preferably that part of the average molecular weight of the copolymer that is attributable to the oxyalkylene blocks can vary from 176 [for $(C_2H_4O)_4$] to 200,000 or greater, but more preferably it is from 176 to 15,000.

The copolymers of this invention can contain siloxane blocks and oxyalkylene blocks in any relative amount. The copolymers in general contain from 5 parts by weight to 95 parts by weight of siloxane blocks and from 5 parts by weight of oxyalkylene blocks per 100 parts by weight of the copolymer. Preferably, the copolymers of this invention contain 5 parts by weight to 50 parts by weight of the siloxane blocks and from 50 parts by weight to 95 parts by weight of the oxyalkylene blocks per 100 parts by weight of the copolymer.

The copolymers of this invention can contain more than one of each of the blocks and the blocks can be arranged in various configurations such as linear, cyclic or branched configurations. By way of illustration, the following classes of compounds are among the siloxane-oxyalkylene block copolymers of this invention:

(A) Copolymers that contain at least one unit represented by the formula:

(4)
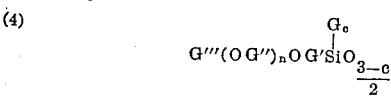

and at least one unit represented by Formula 2 wherein R is a monovalent hydrocarbon group.

(B) Copolymers that contain at least one unit that is represented by the formula:

(5)
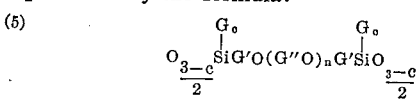

and at least one unit represented by Formula 2 wherein R is a monovalent hydrocarbon group.

(C) Copolymers that contain at least one unit represented by the formula:

(6)
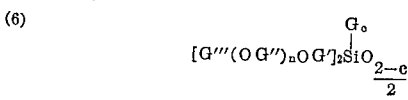

and at least one unit represented by Formula 2 wherein R is a monovalent hydrocarbon group.

In the above Formulas 4, 5 and 6, G is a monovalent hydrocarbon radical, G' is a divalent hydrocarbon radical, G'' is an alkylene radical containing at least two carbon atoms, G''' is a hydrogen atom or a monovalent hydrocarbon radical free of aliphatic unsaturation, $n$ is an integer preferably having a value of at least four, and $c$ has a value from 0 to 2 in Formulas 4, 5 and a value from 0 to 1 in Formula 6. In Formulas 4, 5 and 6, G can represent the same or different radicals, $n$ preferably has a value from 4 to 30 and G'' can represent the same or different radicals, i.e., the group $(OG'')_n$ can represent, for example, the groups: $-(OC_2H_4)_p-$, $-(OC_2H_4)_p(OC_3H_6)_q-$, $-(OC_3H_6)_p-$ or $-(OC_2H_4)_p(OC_6H_{16})_q-$ where $p$ and $q$ are integers having a value of at least one.

The monovalent hydrocarbon radicals represented by G in Formulas 4, 5 and 6 can be saturated or olefinically unsaturated or can contain benzenoid unsaturation. Illustrative of the monovalent hydrocarbon radicals represented by G are the linear aliphatic radicals (e.g., the methyl, ethyl and decyl radicals), the cycloaliphatic radicals (e.g., the cyclohexyl and the cyclopentyl radicals), the aryl radicals (e.g., the phenyl, tolyl, xylyl and naphthyl radicals), the aralkyl radicals (e.g., the benzyl and beta-phenylethyl radicals), the unsaturated linear aliphatic radicals (e.g., the vinyl, allyl and hexenyl radicals) and the unsaturated cyco-aliphatic radicals (e.g., the cyclohxenyl radical).

Preferably, the G and G' groups [included in the definition of R in Formulas 1 and 2 above] contain from one to about twelve carbon atoms and the G'' groups [included in the definition of R' in Formula 3 above] contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 4, 5 and 6 are the alkylene radicals (e.g., the methylene, ethylene, 1,3-propylene, 1,4-butylene and 1,12-dodecylene radicals), the arylene radicals (e.g., the phenylene radical) and the alkarylene radicals (e.g., the phenylethylene radicals). In Formulas 4, 5 and 6, G' is preferably an alkylene radical containing at least two carbon atoms.

Illustrative of the alkylene radicals containing at least two carbon atoms represented by G'' in Formulas 4, 5 and 6 are the ethylene, 1,2-propylene, 1,3-propylene, 1,6-hexylene, 2-ethylhexylene-1,6 and 1,12-dodecylene radicals.

Illustrative of the radicals represented by G''' in Formulas 4, 5 and 6 are the saturated linear or branched chain aliphatic hydrocarbon radicals (e.g., the methyl, ethyl propyl, n-butyl, tert.-butyl and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl, and xylyl radicals), and the aralkyl hydrocarbon radicals (e.g., the benzyl and beta-phenylethyl radicals).

In the formulas employed herein, Me represents methyl ($CH_3$), Et represents ethyl ($CH_3CH_2$), $\phi$ represents phenyl ($C_6H_5$), and $x$ is an integer. Where the formula represents a unit of a polymer, it is understood that the polymer is terminated by end-blocking groups of the type described hereinabove.

The following are representative of the siloxane-oxyalkylene block copolymers of this invention.

(a)
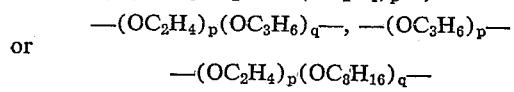

(b)
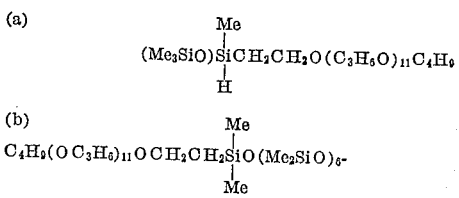

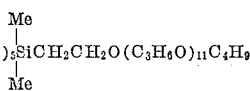

(c) 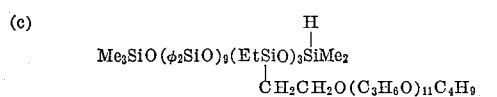

(d) 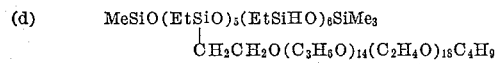

(e) The cyclic tetramer:

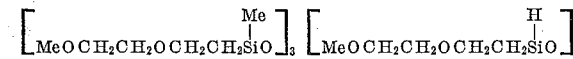

(f) 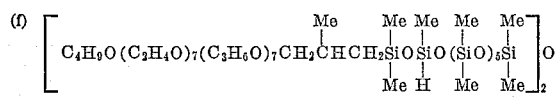

(g) 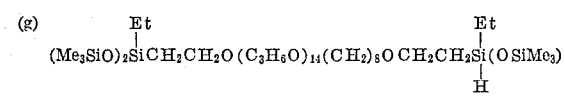

(h) 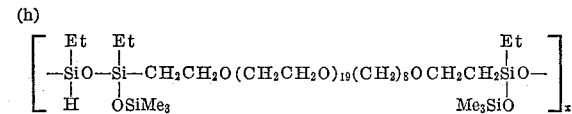

(i) 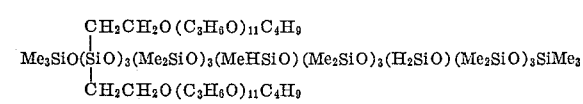

(j) 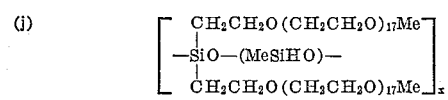

(k) 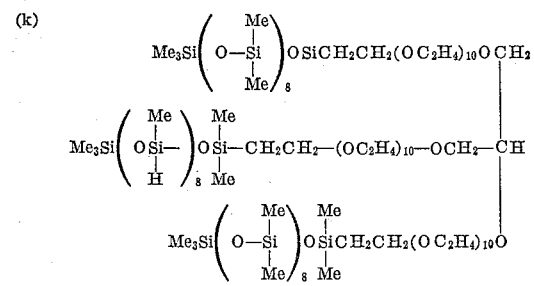

(l) 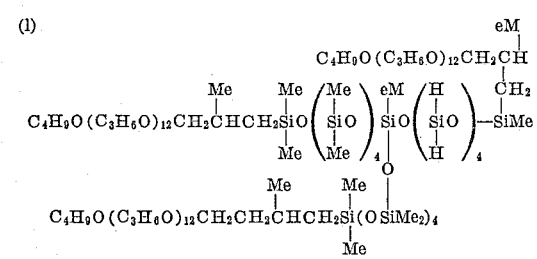

The ratio of silicon-bonded hydrogen atoms (SiH) to silicon atoms (Si) in specific copolymers (a) to (l) above are as follows:

| Copolymer: | SiH to Si Ratio |
|---|---|
| (a) | 1:2 |
| (b) | 1:7 |
| (c) | 1:14 |
| (d) | 1:2.2 |
| (e) | 1:4 |
| (f) | 1:8 |
| (g) | 1:5 |
| (h) | 1:5 |
| (i) | 1:5.3 |
| (j) | 1:2 |
| (k) | 1:3.8 |
| (l) | 1:2 |

The copolymers of this invention can be produced by a process that involves forming a mixture of a siloxane polymer containing silicon-bonded hydrogen atoms (i.e., a $$\overset{|}{\underset{|}{H}}SiO$$

group), an oxyalkylene polymer containing an alkenyloxy end-blocking or chain terminating group and a platinum catalyst and heating the mixture to a temperature sufficiently elevated to cause the siloxane polymer and the oxyalkylene polymer to react to produce the copolymer. The oxyalkylene polymer is used in an amount less than the stoichiometric equivalent necessary to react with all silicon-bonded hydrogen atoms or the reaction is stopped before all silicon bonded hydrogen atoms have reacted with alkenyloxy groups in order that the product copolymer will contain at least one silicon bonded hydrogen atom, that is, at least one unit of Formula 2 above. This process is an addition reaction that can be illustrated by the following equation:

(7)

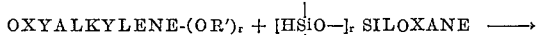

wherein r is an integer that has a value of at least 1 and preferably 1 to about 4, SILOXANE denotes a siloxane block and OXYALKYLENE denotes an oxyalkylene block, OR′ is an alkenyloxy group (such as the vinyloxy and the allyloxy groups) and R″ is an alkylene group containing at least two successive carbon atoms. The product is a copolymer of this invention containing a siloxane block that is linked to an oxyalkylene block by an alkylene group that has at least two successive carbon atoms (e.g., an ethylene, 1,2-propylene or 1,2-butylene group and the like). Useful catalysts contain from 0.001 to 5.0 weight percent platinum based on the reactants. Especially useful catalysts are platinum supported on the gamma allotrope of alumina and chloroplatinic acid. Liquid organic compounds in which the starting polymers are mutually soluble, such as toluene, can be used in the addition process. The temperature employed can vary from 25° C. to 200° C.

The starting oxyalkylene polymers used in producing the copolymers useful in this invention by the above-described process are end-blocked by one, two or more alkenyloxy groups. These alkenyloxy groups react to produce the divalent hydrocarbon groups that link the oxyalkylene blocks to the siloxane blocks in the copolymer. When the starting oxyalkylene polymer contains only one end-blocking alkenyloxy group, it contains other end-blocking groups, such as alkoxy or aryloxy groups. In addition to the alkenyloxy end-blocking group or groups, the starting oxyalkylene polymer contains at least four oxyalkylene groups represented by Formula 3.

The starting oxyalkylene polymer used in this process can be produced by known processes. By way of illustration, a typical starting vinyloxy end-blocked oxyalkylene polymer can be produced by a process that involves forming a mixture of a hydroxyl end-blocked oxyalkylene polymer, acetylene and a catalyst (such as potassium hydroxide) and causing the polymer and the acetylene to react to produce the starting oxyalkylene polymer. Hydroxyl end-blocked oxyalkylene polymers that are useful in producing alkenyloxy end-blocked oxyalkylene polymers are disclosed in United States Patents Nos. 2,448,664, 2,425,755 and 2,425,845.

As a further illustration, allyloxy, methallyloxy and other alkenyloxy end-blocked oxyalkylene polymers can be produced by a process that involves forming a mixture of (a) a sodium or potassium salt of a hydroxy end-blocked oxyalkylene polymer and (b) an alkenyl halide, such as an allyl halide or methallyl halide, and causing the mixture to react to produce the starting oxyalkylene polymer.

The siloxane polymers that are used as a starting material in producing the copolymers of this invention contain at least one unit represented by Formula 1 and at least one unit represented by Formula 2, wherein R is a monovalent hydrocarbon group, and at least two silicon-bonded hydrogen atoms. At least one silicon-bonded hydrogen atom must be present to react with the alkenyloxy group of the oxyalkylene polymer and at least one silicon-bonded hydrogen atom must be present in the block copolymer produced.

The starting siloxane polymers can be produced by known processes. By way of illustration, a typical starting siloxane polymer can be produced by a process that involves forming a mixture of methylhydrogensiloxane cyclic tetramer, hexamethyldisiloxane and an acidic equilibration catalyst (such as sulfuric acid) and stirring the mixture at about room temperature until the siloxanes equilibrate to produce a starting siloxane polymer having the formula $$Me_3SiO(HSiMeO)_4SiMe_3$$

Siloxane-oxyalkylene copolymers of this invention can be produced by the process described herein from starting siloxane polymers and starting oxyalkylene polymers containing other groups in addition to those indicated above. By way of illustration, copolymers can be produced by the addition process from (a) the siloxanes described above as useful in the addition reaction and (b) alkenyloxy end-blocked oxyalkylene polymers that contain groups derived from organic compounds containing three or more hydroxy substituents. As a further illustration, copolymers can be produced from starting siloxanes containing a polyvalent hydrocarbon group that is attached to two or more siloxane groups by carbon-to-silicon bonds.

Starting oxyalkylene polymers that contain groups derived from organic compounds containing three or more hydroxyl substituents can be produced by employing organic compounds containing three or more hydroxyl substituents as starters, in the reaction that produces the polymer. Illustrative of such organic compounds containing three or more hydroxyl substituents are glycerine; 1,2,6-hexanetriol; 1,3,5-hexanetriol; trimethylolmethane; trimethylolethane, and the like. Copolymers produced from oxyalkylene polymers having units derived from such polyhydroxy compounds possess additional cross-linking due to the presence of the group derived from the polyhydroxy compound.

When the copolymers of this invention contain olefinically unsaturated groups attached to silicon (for example, when R in Formulas 1 or 2 above is alkenyl or cycloalkenyl such as vinyl or cyclohexenyl) it is preferable to prepare these copolymers by addition of the alkenyloxy-end-blocked oxyalkylene polymer to a monomeric, hydrolyzable silane containing siliconbonded hydrogen, followed by cohydrolysis or co-condensation with other hydrolyzable silanes containing silicon-bonded and silicon-bonded olefinically unsaturated hydrocarbon groups using conventional techniques known to those versed in the art. For example, reaction of $CH_2=CHCH_2(OC_2H_4)_6OCH_3$ with $CH_3SiHCl_2$ in the presence of a platinum catalyst followed by cohydrolysis of the product with $$CH_2=CHSi(CH_3)Cl_2,$$

$CH_3SiHCl_2$, and $(CH_3)_3SiCl$ gives a copolymer of this invention containing units having the formulas:

$$[CH_3O(C_2H_4O)_6CH_2CH_2CH_2Si(CH_3O)],$$

$[CH_2=CHSi(CH_3)O]$ and $[CH_3SiHO]$, end-blocked with $[(CH_3)_3SiO]$ groups.

The copolymers of this invention posses a variety of outstanding properties. By way of illustration, the copolymers can be emulsified or dispersed in water without the aid of an emulsifying or dispersing agent. In addition, silicon-bonded hydrogen atoms in the copolymers can be reacted with a variety of substrates to form adherent coatings thereon. The self-emulsifying or self-dispersing properties of the copolymers coupled with their cure properties makes them admirably suited as organic textile treating materials. Thus, stable emulsions or dispersions of the copolymers in water can be prepared and applied to the surfaces of organic textiles and the copolymers can be cured on surfaces of the organic textiles to produce permanent water repellent coatings on the textiles.

The above-mentioned textile treating compositions (emulsions or dispersions) preferably contain a catalytic amount of a cure catalyst to affect the cure of the copolymer on the textile. Suitable curing catalyst includes organic salts of lead, tin, zinc, copper, zirconium, titanium and the like. Preferred organic moieties in such employed salts are acid radicals derived from fatty acids such as lauric acid, palmitic acid, oleic acid, stearic acid, coconut fatty acid, and 2-ethylhexoic acid. Removal of water and cure of the copolymer on the textile is readily achieved by heating the treated textile up to 200° C. The copolymers preferred in such textile treating compositions have siloxane blocks having a total molecular weight between about 1000 and 3500 and contain only methyl substituents. The oxyalkylene blocks preferably have a total molecular weight between 300 and 3000 and contain primarily or only ethyleneoxy units.

Textile materials that can be treated with the above-described textile treating compositions include the natural and semi-synthetic organic textile materials including cotton, linen, ramie, hemp, jute, wood pulp, paper, leather, furs, feathers, cellulose ethers, cellulose esters (e.g. cellulose acetate and cellulose), regenerated cellulose rayons produced by any process (e.g., viscose, cuprammonium, etc.), natural silks, tussore silk, wool and the like. Suitable synthetic organic textile materials include those prepared from monofilaments and continuous yarns from fibers such as the polyamides (nylons), the acrylics and vinyl-, vinylidene-type fibers (Orlons, Acrilan, Creslan, Dynel, Darlon, Verel, Zefran, Velon, Vinyon and Teflon), the polyester fibers (Dacron, Terylene, etc.), and polyethylene fibers. Also included are textiles prepared from mixed or blended yarns produced by spinning combinations of selected natural, semi-synthetic and synthetic fibers from among the above-enumerated textile and fibrous materials including, for example, Orlon-wool, nylon-wool, Orlon-orayon, Dynel-viscose, Dacron-cotton, Dacron-nylon, and the like.

In addition, the copolymers of this invention can be emulsified or dispersed in water and cured on a glass surface to produce a permanent coating which is resistent to fog formation on the glass surface.

The siloxane-oxyalkylene block copolymers of this invention possess excellent high temperature lubricating properties and are particularly useful, either alone or in admixture with other siloxane-oxyalkylene block copolymers, as lubricants for steel surfaces. In addition, they can be dispersed or dissolved in suitable carriers (e.g. water, alcohols, ketones, etc.) and applied to molds on which they function as mold release agents after the carrier is volatilized. Other applications in which the copolymers of this invention can be used to advantage are as hydraulic fluids, damping fluids and emulsifying agents for mixtures of water and organic solvents (e.g. toluene). An outstanding property of the copolymers of this invention that render them particularly useful in the above applications is their stability to hydrolysis both in acidic and strongly basic environments and at elevated temperatures.

The siloxane-oxyalkylene block copolymers of this invention are also useful as foam stabilizers in polyurethane foam formulations. Polyurethane foam formulations contain at least one polyether, at least one organic isocyanate and a catalyst for the polyether-isocyanate reaction. When added to such foam formulations in amounts up to about 10 weight percent, based on the total weight of the foamed formulation, the siloxane-oxyalkylene block copolymer stabilizes the foam produced during the foaming reaction, thus making possible the production of polyurethane foams of high quality.

*Lubricant test procedures.*—The following tests were conducted on siloxane-oxyalkylene block copolymers of this invention to evaluate them as lubricants.

(A) *Falex load test.*—In this test the lubricant is evaluated in a Falex Lubricant Test Machine. The machine consists of a steel shaft and two steel V-blocks that are positioned so that they can be forced against the shaft. The shaft and V-blocks are immersed in the lubricant to be tested. The shaft is rotated and a load is supplied to the V-blocks, forcing them against the shaft. The load is increased until failure occurs (i.e., seizure between the rotating shaft and the V-blocks or a radical increase in wear with no increase in load). The load at which failure occurs is the "Falex Load" value for the lubricant. The Falex Load values for various known fluids are as follows—

| Fluid: | Falex Load (pounds) |
|---|---|
| $C_4H_9(OC_3H_6)_6OH$ | 400 |
| $C_4H_9(OC_3H_6)_{17.7}OH$ | 1250 |
| Dimethylpolysiloxane oil | <100 |
| Gulf security oil "A" (a refined petroleum oil having a viscosity of about 44 SUS at 210° F.) | <500 |
| Kendall automatic transmission oil (a refined paraffinic hydrocarbon oil having a viscosity of about 52 SUS at 210° F.) | <500 |

(B) *Falex wear test.*—This test is conducted in a manner similar to the Falex Load Test except that the load on the V-blocks is kept constant for a fixed period of time. The loss in weight of the rotating shaft caused by contact with the V-blocks is the "Falex Wear" value for the lubricant. The Falex Wear values for various known fluids are as follows—

| Fluid: | Falex Wear (milligrams) |
|---|---|
| $C_4H_9(OC_3H_6)_6OH$ | failed |
| $C_4H_9(OC_3H_6)_{17.7}OH$ | 20 |
| Dimethylpolysiloxane oil | 174 |
| Gulf security oil "A" | failed |
| Kendall automatic transmission oil | failed |

In the examples hereinbelow, silicon bonded hydrogen was determined by heating a mixture of a siloxane-oxyalkylene block copolymer of this invention with aqueous potassium hydroxide, alcoholic potassium hydroxide, or a mixture of the two. Hydrogen gas was evolved in a ratio of one mole of hydrogen gas per mole of silicon bonded hydrogen in the copolymer.

The following examples are presented:

*Example 1*

A solution was formed in a 500 cc. three necked flask that was equipped with a reflux condenser, thermometer and a stirrer. The mixture contained 50 g. of an oxyalkylene polymer, that has the average formula:

$$CH_2=CHO(C_3H_6O)_{14}(C_4H_8O)_{18}C_4H_9$$

13.5 g. of a siloxane polymer having the average formula: $(CH_3)_3SiO(C_2H_5SiOH)_{11}Si(CH_3)_3$, 60 g. of normal-butyl ether and 1 g. of a platinum-on-gamma-alumina. The catalyst contained one part by weight of platinum per 100 parts by weight of platinum and gamma-alumina. The mixture was continuously stirred and heated at a temperature of 146° C. for 10 hours. The mixture refluxed at this temperature. Then the flask was cooled to room temperature and the catalyst was separated by centrifuging the contents of the flask and decanting the liquid portion. Volatile materials were removed from the liquid so obtained by heating the liquid at a temperature of 160° C. and at one mm. of Hg to produce a residue. The residue produced after removing the volatile materials was a siloxane-oxyalkylene block copolymer of this invention that has a viscosity of 1435 centistokes at 25° C. and gave an analysis for silicon-bonded hydrogen of 38.8 cc./gram. The copolymer was soluble in water and had the average formula:

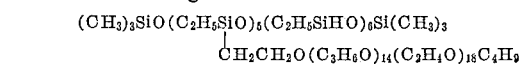

*Example 2*

A mixture was formed in a 500 cc. three-necked flask that was equipped with a stirrer, a reflux condenser and a thermometer. The mixture contained 50 g. (0.05 mole) of a dialkenyl ether of an oxyalkylene polymer that had the average formula:

$$CH_2=CHO(CH_2CH_2O)_{19}C_8H_{16}OCH=CH_2$$

19.2 g. (0.05 mole) of a siloxane polymer having the average formula: $Me_3SiO(C_3H_5SiHO)_3SiMe_3$ and 1 g. (1.45 parts by weight per 100 parts by weight of the ether and the siloxane polymer) of a platinum-on-gamma alumina. The mixture was continuously stirred while heated at 150° C. for 10 hours. The flask was cooled to room temperature. Benzene was added to the flask, the mixture was centrifuged, and the liquid portion was decanted. The liquid was heated at 150° C. at one mm. Hg to remove volatile material and to produce a residue. The residue was a siloxane-oxyalkylene block copolymer of this invention that was an oil having a viscosity of 2326 centistokes at 25° C. The copolymer so produced was insoluble in water and contained units having the average formula:

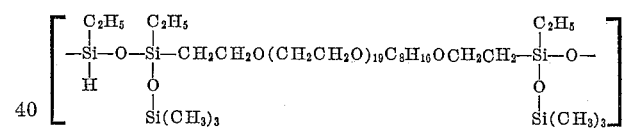

*Example 3*

A methyl-terminated, dimethylpolysiloxane having an average molecular weight of about 1500 and containing an average of about four non-terminal, silicon-bonded hydrogen atoms (contained in methylhydrogensiloxy units) per molecule was prepared by conventional procedures. A series of three siloxane-oxyalkylene block copolymers of this invention was prepared by the platinum-catalyzed reaction of this polysiloxane with about one, two and three mole equivalents, respectively, of a methallyl-terminated polyoxyalkylene ether having the average formula:

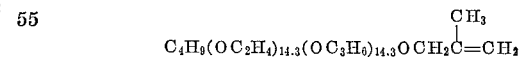

The resulting copolymers contained, respectively, about three methylhydrogensiloxy units in the siloxane block and one oxyalkylene block, about two methylhydrogensiloxy units in the siloxane block and two oxyalkylene blocks, and about one methylhydrogensiloxy unit in the siloxane block and three oxyalkylene blocks. The oxyalkylene blocks having the average formula:

were interconnected to methylsiloxy units in the siloxane block through

*Example 4*

A one liter, three-necked flask equipped with a stirrer was employed as the reaction vessel. Three hundred forty-three grams of oxyalkylene polymer having the average formula: $C_4H_9O(C_3H_6O)_{15}CH=CH_2$, 517 grams of a polysiloxane having the average formula:

$$(CH_3)_3SiO(CH_3SiHO)_2Si(CH_3)_3$$

and 0.79 gram of a catalyst (one percent platinum-on-gamma alumina) were placed in the flask and the mixture heated with stirring at about 150° C. for about eight hours. The reaction mixture was allowed to cool overnight and was then filtered through a coarse glass frit to remove the catalyst. The filtrate was then heated up to 180° C. over a period of 1.5 hours and was further heated under reduced pressure for an additional 1.5 hours. The residue was a mixture containing about 14 weight percent of a siloxane oxyalkylene block copolymer of this invention having the average formula:

$$(CH_3)_3SiO(CH_3SiO)(CH_3SiOH)Si(CH_3)_3$$
$$\;\;\;\;\;\;\;\;\;\;\;\;\;\;\;\;\;\;|$$
$$\;\;\;\;\;\;\;\;\;\;\;\;\;\;CH_2CH_2(OC_3H_6)_{15}OC_4H_9$$

and about 85 weight percent of a copolymer (not of this invention) having the average formula:

$$(CH_3)_3SiO(CH_3SiO)_2Si(CH_3)_3$$
$$\;\;\;\;\;\;\;\;\;\;\;\;\;\;|$$
$$\;\;\;\;\;\;\;\;CH_2CH_2(OC_3H_6)_{15}OC_4H_9$$

The product mixture had a viscosity of 107.8 centistokes at 25° C. and gave a silanic hydrogen analysis of 2.6 cc. per gram. The product mixture was tested as a lubricant and gave a Falex Load Test value of 1750 pounds, and a Falex Wear value of two milligrams.

*Example 5*

A kettle equipped with a mechanical stirrer, Dean-Stark trap and reflux condenser was employed as the reaction vessel. Three hundred forty-seven and six-tenths grams of oxyalkylene polymer having the average formula: $C_4H_9OC_3H_6OCH=CH_2$ and 290 grams of normal-butyl ether were added to the kettle and the mixture was heated to 100° C. next, 9.35 grams of catalyst (1.5 percent platinum-on-gamma alumina) was added to the reaction mixture which was then heated to its reflux temperature of about 154° C. A 120 gram portion of a polysiloxane cyclic tetramer having the formula: $(CH_3SiHO)_4$ was then added dropwise to the refluxing reaction mixture over a 50 minute period and the final reaction mixture was heated at reflux temperature of 156° C. for an additional 6½ hours, allowed to stand at room temperature overnight and then heated at reflux temperature of 156° C. for an additional 3.5 hours. The reaction mixture was then filtered through filter paper to remove the catalyst and the filtrate was heated at 100° C. at a pressure of 1 mm. Hg for one hour and then sparged with nitrogen gas under reduced pressure for two hours at 150° C. The final product was a mixture comprising, as the principal product, a copolymer (not of this invention) having the formula:

$$(CH_3SiO)_4$$
$$\;\;\;\;\;|$$
$$CH_2CH_2OC_3H_6OC_4H_9$$

and smaller quantities of siloxane oxyalkylene block copolymers of this invention having the formula:

$$(CH_3SiHO)_y(CH_3SiO)_{4-y}$$
$$\;\;\;\;\;\;\;\;\;\;\;\;\;\;|$$
$$\;\;\;\;\;\;CH_2CH_2OC_3H_6OC_4H_9$$

wherein y is an integer having a value from 1 to 3 inclusive. The product mixture had a viscosity of 21 centistokes at 100° F., a density of 0.985 gram per milliliter at 25° C., and gave a silanic hydrogen analysis of 5 cc. per gram. The product mixture gave a Falex Load Test value of 900 pounds.

*Example 6*

A one liter, round bottom flask equipped with a mechanical stirrer, Dean Stark trap and a reflux condenser was employed as the reaction vessel. Thirty grams of a polysiloxane cyclic tetramer having the formula:

$$(CH_3SiHO)_4$$

424.6 grams of an oxyalkylene polymer having the formula: $C_4H_9O(C_3H_6O)_{12}CH=CH_2$, 250 grams of normal-butyl ether and 9.09 grams of catalyst (1.5 weight percent platinum-on-gamma alumina) were mixed together in the flask and heated at the reflux temperature of the mixture (149° C. to 153° C.) for ten hours. The reaction mixture was filtered through filter paper to remove the catalyst and the filtrate was heated under reduced pressure to a temperature of 140° C. at a pressure of 6 mm. Hg. The residue was a mixture comprising, as the principal product, a copolymer (not of this invention) having the formula:

$$(CH_3SiO)_4$$
$$\;\;\;\;\;|$$
$$CH_2CH_2(OC_3H_6)_{12}OC_4H_9$$

and smaller quantities of siloxane oxyalkylene block copolymers of this invention having the formula:

$$(CH_3SiHO)_y(CH_3SiO)_{4-y}$$
$$\;\;\;\;\;\;\;\;\;\;\;\;\;\;|$$
$$\;\;\;\;\;CH_2CH_2(OC_3H_6)_{12}OC_4H_9$$

wherein y is an integer having a value from 1 to 3 inclusive. The product mixture had a viscosity of 190.2 centistokes at 100° F., a density of 0.997 at 25.4° C. and gave an analysis for silanic hydrogen of 2 cc. per gram. The product mixture was tested as a lubricant and gave a Falex Load Test value of 1900 pounds.

*Example 7*

A one liter, three-necked flask equipped with a mechanical stirrer, Dean Stark trap and reflux condenser was employed as the reaction vessel. One hundred twenty-eight grams of a siloxane having the formula:

$$(CH_3)_3SiO(CH_3SiHO)_3Si(CH_3)_3$$

372 grams of an oxyalkylene polymer having the average formula: $C_4H_9O(C_3H_6O)_4CH=CH_2$, 200 milliliters of normal-butyl ether and 5 grams of catalyst (1.5 weight percent platinum-on-gamma alumina) were mixed together in the flask and heated to the reflux temperature of the mixture (about 165° C.) for 24 hours. The reaction mixture was then allowed to stand at room temperature for 48 hours and was filtered to remove the catalyst. Ether solvent was removed by distillation at atmospheric pressure to a still head temperature of 142° C. The residue was then sparged with nitrogen at 150° C. and a pressure of 7 mm. Hg for one hour. The residue was a mixture comprising, as the principal product, a copolymer (not of this invention) having the formula:

$$(CH_3)_3SiO(CH_3SiO)_3Si(CH_3)_3$$
$$\;\;\;\;\;\;\;\;\;\;\;\;\;\;|$$
$$\;\;\;\;\;CH_2CH_2(OC_3H_6)_4OC_4H_9$$

and smaller quantities of siloxane-oxyalkylene block copolymers of this invention having the formula:

$$(CH_3)_3SiO(CH_3SiO)_{3-y}(CH_3SiHO)_ySi(CH_3)_3$$
$$\;\;\;\;\;\;\;\;\;\;\;\;\;\;\;\;\;\;\;\;|$$
$$\;\;\;\;\;\;\;\;\;CH_2CH_2(OC_3H_6)_4OC_4H_9$$

wherein y is an integer having a value from 1 to 2 inclusive. The product mixture had a viscosity of 20.5 centistokes at 100° F. and gave an analysis for silanic hydrogen of 6.8 cc. per gram. The product mixture was tested as a lubricant and gave a Falex Load Test of 1400 pounds.

*Example 8*

A flask equipped with a stirrer, reflux condenser and dropping funnel was employed as the reaction vessel. Thirty-seven and five-tenths grams of a siloxane polymer represented by the average formula:

$$Me_3SiO(Me_2SiO)_3(MeHSiO)_{15}SiMe_3$$

150 mm. of toluene, and sufficient chloroplatinic $$(H_2PtCl_6)$$

to provide 13 parts per million platinum based on total reactants plus total solvent were placed in the flask and heated to 115° C. Next 125 grams of oxyalkylene polymer having the average formula:

$$MeO(C_2H_4O)_7CH_2CH=CH_2$$

and containing sufficient chloroplatinic acid to provide 37 parts per million platinum based on total reactants plus total solvent were added over a two hour period. The reaction mixture was sparged with nitrogen at a temperature of 130° C. The product was siloxane-oxyalkylene block copolymer of this invention which was soluble in water. Bulk surface tension at 25° C. was 30.8 dynes/cm. The average composition of this copolymer was:

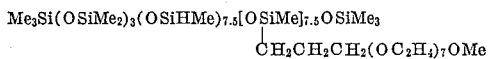

Example 9

A 500 milliliter, round bottom flask equipped with a stirrer, condenser and dropping funnel was employed as the reaction vessel. One hundred thirty-five grams of a siloxane polymer having the average formula:

$$Me_3SiO(Me_2SiO)_3(MeHSiO)_{15}SiMe_3$$

and 100 grams of toluene were placed in the flask and heated with stirring to 100° C. Sufficient chloroplatinic acid to provide 40 parts per million platinum based on reactants plus solvent was added to the reaction mixture and the mixture was heated to its reflux temperature. Fifteen grams of an oxyalkylene polymer having the average formula: $MeO(C_2H_4O)_7CH_2CH=CH_2$ was dissolved in 50 grams of toluene, was added to the reaction mixture over a ½ hour period and the final mixture heated to its reflux temperature for one hour. An additional quantity of chloroplatinic acid sufficient to provide 40 parts per million of platinum was added and the mixture again heated at reflux temperature for an hour. The final reaction mixture was sparged with nitrogen at 130° C. The final product was a mixture of unreacted starting siloxane and siloxane oxyalkylene block copolymer of this invention having the average formula:

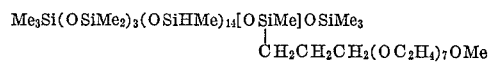

Example 10

A 500 milliliter, 3 necked flask equipped with a stirrer, condenser, and dropping funnel was used as the reaction vessel. One hundred thirty-five grams of a siloxane polymer having the average formula:

$$Me_3SiO(MeHSiO)_{39}SiMe_3$$

and 100 grams of toluene were placed in the flask and heated to its reflux temperature of the mixture. Forty parts per million platinum as chloroplatinic acid was added to the refluxing mixture. Next, 15 grams of an oxyalkylene polymer having the average formula:

$$MeO(C_2H_4O)_7CH_2CH=CH_2$$

dissolved in 50 grams of toluene was added from the dropping funnel over a ½ hour period. The reaction mixture was heated at its reflux temperature for an additional two hours and was then sparged with nitrogen for two hours, at 130° C. The product was a mixture of unreacted starting siloxane and a siloxane-oxyalkylene block copolymer of this invention having the average formula:

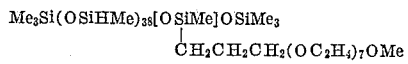

Example 11

A 500 milliliter, round bottom flask equipped with a stirrer, condenser and dropping funnel was used as the reaction vessel. Three hundred seventy-six grams of a siloxane polymer having the average formula:

$$Me_3Si(OSiMe_2)_5(OMeSiH)_7OSiMe_3$$

and 50 milliliters of toluene were added to the flask and heated to 100° C. Sufficient chloroplatinic acid catalyst to provide 40 parts per million platinum was added.

Next, 112.4 grams of a carefully dried oxyalkylene polymer having the average formula:

$$C_4H_9O(C_3H_6O)_{35}CH_2CH=CH_2$$

dissolved in 100 milliliters of toluene was added from the dropping funnel over a ½ hour period, and the reaction mixture was then heated to its refluxing temperature (120° C. for two hours). The reaction product was sparged with nitrogen at 130° C. for 1 hour. The final product was a viscous, yellow siloxane-oxyalkylene block copolymer of this invention.

The ratios of silicon-bonded hydrogen atoms to silicon atoms in the copolymers described in the above examples are as follows:

| Copolymer: | SiH to Si Ratio |
| --- | --- |
| Example 1 | 1:2.2 |
| Example 2 | 1:3 |
| Example 3 | average 1:12.3 |
| Example 4 | 1:4 |
| Example 5 | 1:4 |
| Example 6 | 1:4 |
| Example 7 | 1:5 |
| Example 8 | 1:3 |
| Example 9 | 1:1.4 |
| Example 10 | 1:1 |
| Example 11 | 1:2 |

Example 12

The following compositions were prepared employing a block copolymer of this invention having the average formula:

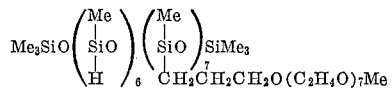

(a) Two grams copolymer, 96.7 grams, water 1.3 grams zinc octasol emulsion (curing catalyst) containing 3 weight percent zinc.

(b) One grain copolymer, 98.4 grams water, 0.6 gram zinc octasol emulsion containing 3 weight percent zinc.

(c) 0.5 gram copolymer, 99.2 grams water, 0.3 gram zinc octasol emulsion containing 3 weight percent zinc.

(d) 0.2 gram copolymer, 00.7 grams water, 0.1 gram zinc octasol emulsion containing 3 weight percent zinc.

A piece of nylon cloth was immersed in each of the compositions (a) through (d) and then heated for fifteen minutes at 100° C. The anti-static properties of the treated nylon samples were then tested by rubbing the cloth samples on wool and then holding them above cigarette ashes contained in a Petri dish. There was no significant ash pick-up. In contrast to the excellent anti-static properties of the treated cloth, nylon coth (1) as received and nylon cloth (2) which was heated at 100° C. for fifteen minutes with rubbed on wool and placed over the cigarette ashes picked up layers of ash over the entire surfaces of the samples.

Example 13

A block copolymer of this invention was prepared which had the average formula:

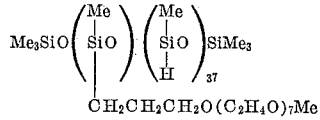

This hydrolytically stable block copolymer is referred to hereinafter as Copolymer-I. Two grams of Copolymer-I, 97 grams water, and 1 gram zinc octasol emulsion (curing catalyst) containing 3 weight percent zinc were placed in an eight ounce jar and shaken. An 8 inch by 8 inch, 80 by 80 cotton print cloth was placed in the emulsion and shaken for thirty seconds. The cloth was then padded on a padder roll, stretched on a rack and dried at 160° C. for six minutes. The water repellency of the so treated cotton cloth was measured by a standard AATCC spray test and given a spray rating of 90.

The treated cotton cloth was then allowed to stand at room temperature over a week-end, and was again subjected to a standard AATCC spray test. The cloth which had cured at room temperature over the week-end gave a spray rating of 100.

*Example 14*

A mixture was prepared comprising about 50 weight percent of Copolymer-I and about 50 weight percent of a polymer having the formula:

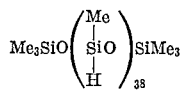

This mixture is referred to hereinafter as Mixture-II. Two treating solutions were prepared, one containing two grams of Copolymer-I, 96.6 grams of water and 1.4 grams zinc octasol emulsion (curing catalyst) containing 3 weight percent zinc. A second solution was prepared containing 2 grams of Mixture-II, 96.6 grams of water and 1.4 grams zinc octasol emulsion (curing catalyst) containing 3 weight percent zinc. Two 8 inch by 8 inch samples of cotton cloth were immersed in each treating solution and shaken for thirty seconds. The treated cloth samples were then padded on padder rolls and dried for five minutes at 100° C. and then five minutes at 160° C. The water repellency of the treated cotton cloth samples was then tested by standard AATCC spray tests before washing, after one washing in a standard automatic wash cycle using a commercial detergent, and again after three and five such washings. The results of these tests are summarized in the following table.

| Treating Solution Containing | Cloth Sample | After Initial Treatment | Spray Ratings | | |
|---|---|---|---|---|---|
| | | | After 1 Washing | After 3 Washings | After 5 Washings |
| Copolymer-I | 1 | 100 | 80+ | 80+ | 80+ |
| Do | 2 | 100 | 80+ | 80+ | 80+ |
| Mixture-II | 1 | 90 | 80- | 0+ | |
| Do | 2 | 80+ | 80- | 0+ | |

*Example 15*

A copolymer of this invention was produced by reacting a siloxane having the formula: $Me_3SiO(MeHSiO)_{37}SiMe_3$ and an oxyalkylene polymer having the formula:

$$CH_2=CHCH_2O(C_2H_4O)_3Me$$

in the presence of a catalytic amount of chloroplatinic acid. The copolymer so produced had the following formula:

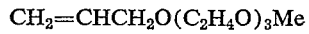

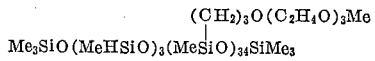

An aqueous solution containing one weight percent of the copolymer had a cloud point of 32° C. and a surface tension of 25.0 dynes per cubic centimeter.

An aqueous solution was prepared containing 10 weight percent of the above copolymer and 0.4 weight percent of $NH_4OH$. Hydrogen was evolved due to the reaction of SiH to produce SiOH. A clean glass beaker was coated with the above solution and then heated for one hour at 110° C. Ice was placed in the beaker which then remained free of fog for over 15 hours. A similar copolymer was produced by reacting all of the SiH groups of the siloxane with the oxyalkylene copolymer. This latter copolymer was applied to the glass beaker in the above-described manner and cured. Fog formed almost immediately on the beaker when ice was placed therein.

What is claimed is:

1. A siloxane-oxyalkylene block copolymer consisting essentially of (a) at least one siloxane block containing at least one siloxane unit represented by the formula:

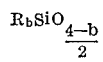

wherein R contains from one to about twelve carbon atoms and is selected from the class consisting of monovalent hydrocarbon groups and alkylene groups containing at least 2 carbon atoms and $b$ has a value from 1 to 3 inclusive, and at least one siloxane unit represented by the formula:

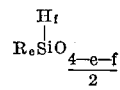

wherein R has the meaning defined hereinabove, $e$ has a value from 0 to 2, $f$ has a value from 1 to 2, and $e$ plus $f$ has a value from 1 to 3, said siloxane block containing at least one of said siloxane units wherein at least one R group is an alkylene group containing at least 2 carbon atoms and (b) at least one oxyalkylene block containing at least one oxyalkylene group represented by the formula —R'O—, wherein R' is an alkylene group containing from two to about ten carbon atoms, said oxyalkylene block being endblocked at each end only by a member selected from the group consisting of said alkylene groups, the hydroxy group, the aryloxy group, the alkoxy group, and the alkenyloxy group, each said siloxane and oxyalkylene blocks being interconnected by said alkylene group, said copolymer having a ratio of silicon-bonded hydrogen atoms to silicon atoms of at least 1 to 14.

2. A siloxane-oxyalkylene block copolymer consisting essentially of at least one unit represented by the formula

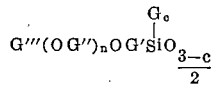

wherein G is a monovalent hydrocarbon radical containing from one to about twelve carbon atoms, G' is an alkylene radical containing from two to about twelve carbon atoms, G'' is an alkylene radical containing from two to about ten carbon atoms, G''' is selected from the group consisting of a hydrogen atom and monovalent hydrocarbon radicals free of aliphatic unsaturation and containing from one to about twelve carbon atoms, $n$ is an integer having a value of from 4 to 30, and $c$ has a value from 0 to 2, and at least one unit represented by the formula

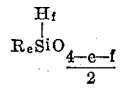

wherein R is a monovalent hydrocarbon group containing from one to about twelve carbon atoms, $e$ has a value from 0 to 2, $f$ has a value from 1 to 2 and $e$ plus $f$ has a value from 1 to 3, said copolymer having a ratio of silicon-bonded hydrogen atoms to silicon atoms of at least 1 to 14.

3. A siloxane-oxyalkylene block copolymer consisting essentially of at least one unit represented by the formula

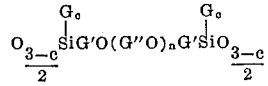

wherein G is a monovalent hydrocarbon radical containing from one to about twelve carbon atoms, G' is an alkylene radical containing from two to about twelve carbon atoms, G″ is an alkylene radical containing from two to about ten carbon atoms, $n$ is an integer having a value of from 4 to 30, and $c$ has a value from 0 to 2, and at least one unit represented by the formula:

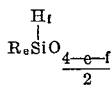

wherein R is a monovalent hydrocarbon group containing from one to about twelve carbon atoms, $e$ has a value from 0 to 2, $f$ has a value from 1 to 2 and $e$ plus $f$ has a value from 1 to 3, said copolymer having a ratio of silicon bonded hydrogen atoms to silicon atoms of at least 1 to 14.

4. A siloxane-oxyalkylene block copolymer consisting essentially of at least one unit represented by the formula:

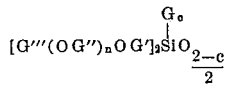

wherein G is a monovalent hydrocarbon radical containing from one to about twelve carbon atoms, G′ is an alkylene radical containing from two to about twelve carbon atoms, G″ is an alkylene radical containing from two to about ten carbon atoms, G‴ is selected from the group consisting of a hydrogen atom and monovalent hydrocarbon radicals free of aliphatic unsaturation and containing from one to about twelve carbon atoms, $n$ is an integer having a value of from 4 to 30, and $c$ has a value from 0 to 1, and at least one unit represented by the formula:

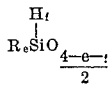

wherein R is a monovalent hydrocarbon group containing from one to about twelve carbon atoms, $e$ has a value from 0 to 2, $f$ has a value from 1 to 2 and $e$ plus $f$ has a value from 1 to 3, said copolymer having a ratio of silicon-bonded hydrogen atoms to silicon atoms of at least 1 to 14.

5. A siloxane-oxyalkylene block copolymer having the average formula:

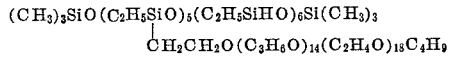

6. A siloxane-oxyalkylene block copolymer consisting essentially of units having the average formula:

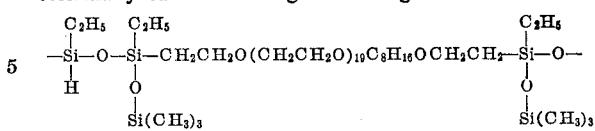

and having a ratio of silicon-bonded hydrogen atoms to silicon atoms of at least 1 to 14.

7. A siloxane-oxyalkylene block copolymer consisting essentially of (a) a methyl-terminated siloxane block containing dimethylsiloxy units and from one to three methylhydrogensiloxy units, and (b) from one to three oxyalkylene blocks having the average formula:

$$C_4H_9(OC_2H_4)_{14.3}(OC_3H_6)_{14.3}O-$$

said oxyalkylene blocks being interconnected to methylsiloxy units in said siloxane block through

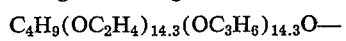

groups, said copolymer having a ratio of silicon-bonded hydrogen atoms to silicon atoms of at least 1 to 14.

8. A cyclic siloxane-oxyalkylene block copolymer having the formula:

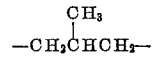

wherein $y$ is an integer having a value from 1 to 3 inclusive.

9. A siloxane-oxyalkylene block copolymer having the average formula:

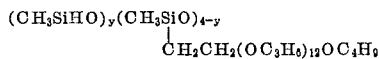

wherein Me represents the methyl group.

References Cited by the Examiner

UNITED STATES PATENTS

| | | | |
|---|---|---|---|
| 2,783,262 | 2/1957 | Merker | 260—448.2 |
| 2,846,458 | 8/1958 | Haluska | 260—448.2 |
| 2,868,824 | 1/1959 | Haluska | 260—448.2 |
| 2,958,707 | 11/1960 | Warrick | 260—448.2 |
| 3,057,901 | 10/1962 | Plueddemann | 260—448.2 |

FOREIGN PATENTS

| | | |
|---|---|---|
| 802,467 | 10/1958 | Great Britain. |
| 1,179,743 | 12/1958 | France. |

TOBIAS E. LEVOW, *Primary Examiner.*

J. G. LEVITT, *Assistant Examiner.*